Figure 1:
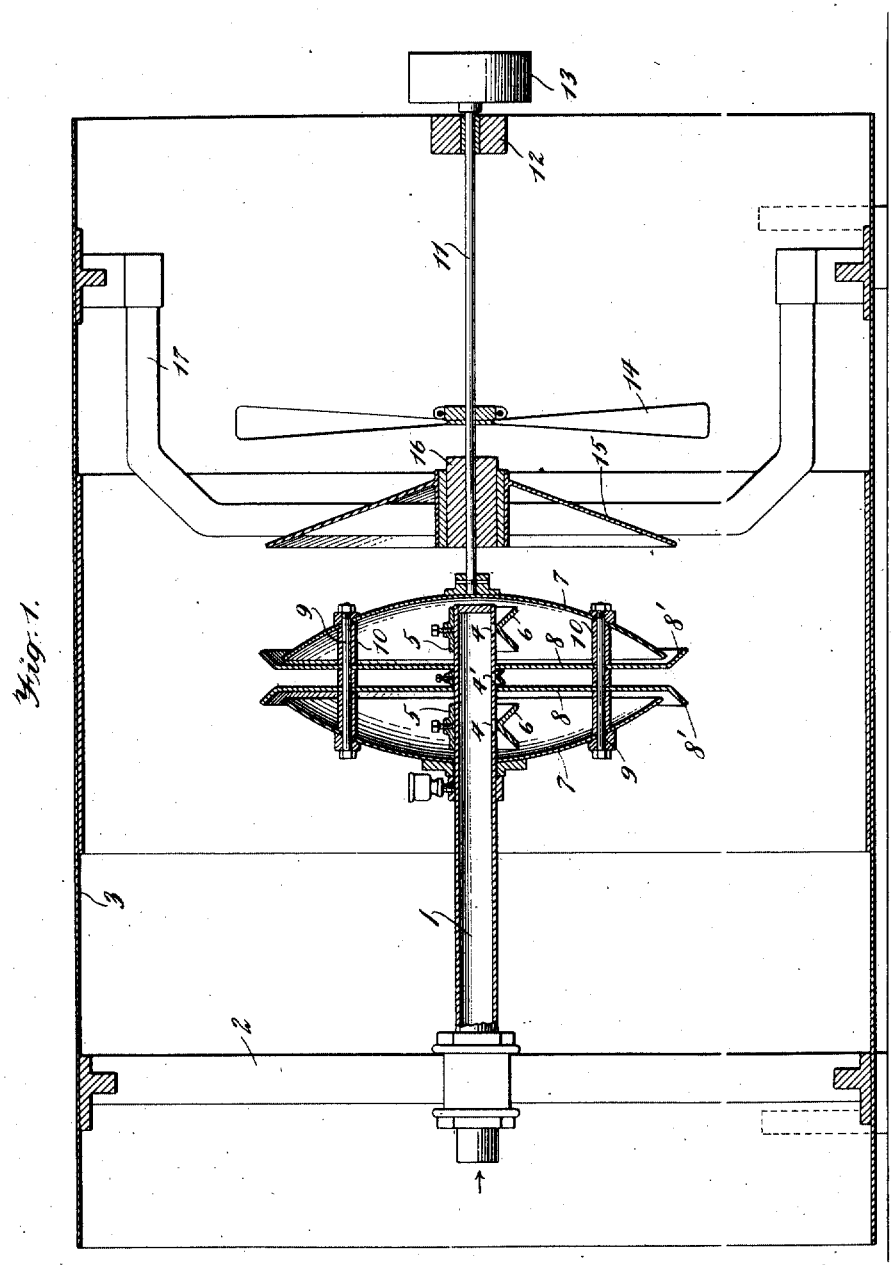

J. LYNN.
SPRAYING OR ATOMIZING DEVICE.
APPLICATION FILED JAN. 11, 1915.

1,223,083.

Patented Apr. 17, 1917.
2 SHEETS—SHEET 1.

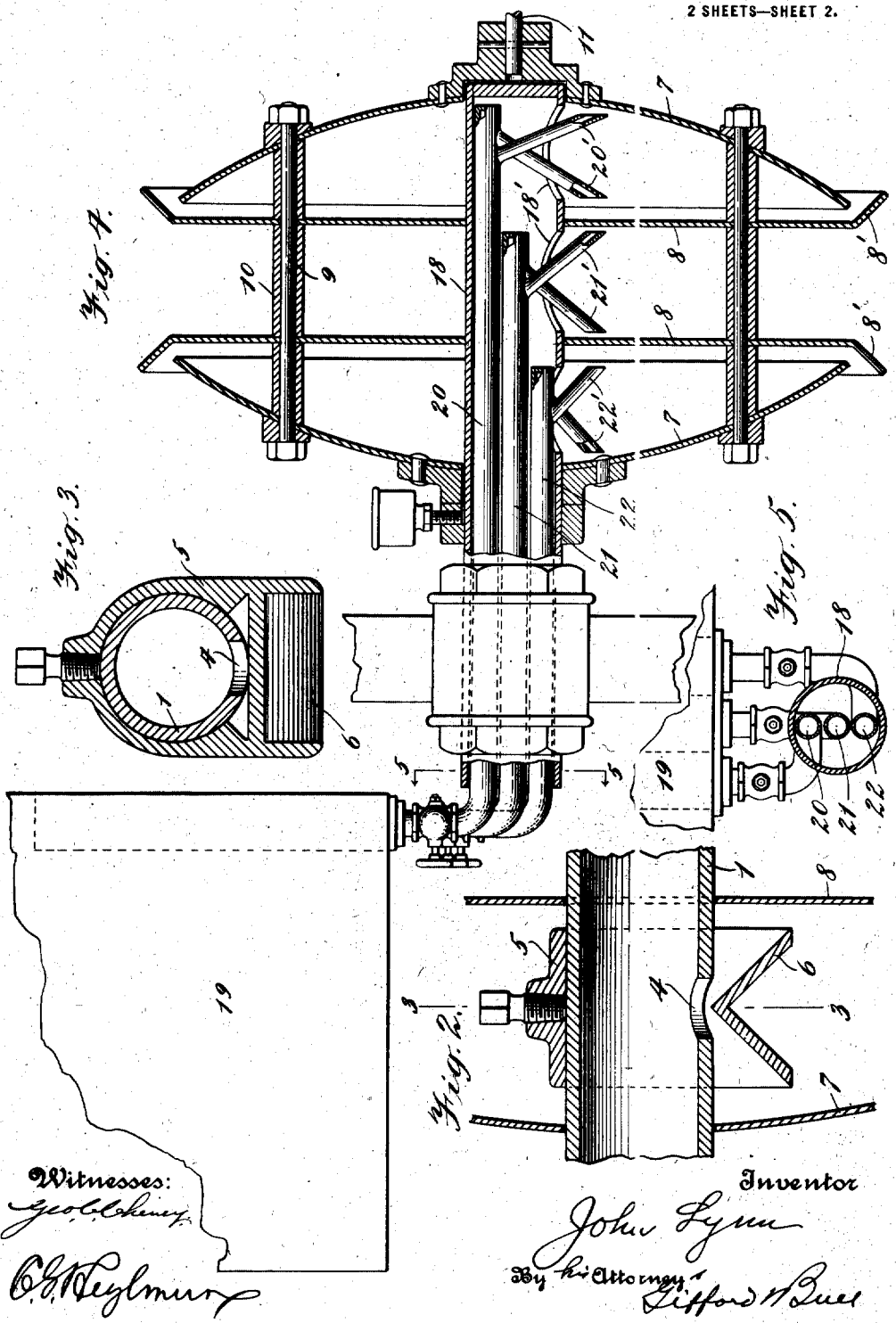

UNITED STATES PATENT OFFICE.

JOHN LYNN, OF NEW YORK, N. Y.

SPRAYING OR ATOMIZING DEVICE 1,223,083.  Specification of Letters Patent.  Patented Apr. 17, 1917.

Application filed January 11, 1915. Serial No. ,545.

*To all whom it may concern:*

Be it known that I, JOHN LYNN, a citizen of the United States, residing at New York city, in the county of Bronx and State of New York, have invented certain new and useful Improvements in Spraying or Atomizing Devices, of which the following is a specification.

My invention relates to a device for spraying or atomizing liquids for cooling, humidifying, disinfecting and other purposes, the object being to atomize or spray the liquid in a fine mist. I have used the device for moistening air, the main feature of the device being a pair of disks so set relatively to each other as to discharge between them, the liquid in a fine mist or spray.

The invention will be understood by reference to the accompanying drawings in which Figure 1 is a side elevation, partly in section, of one embodiment of the invention and showing also its mode of use; Fig. 2 an enlarged detail view of one of the liquid outlets from the supply pipe to the atomizing disks of Fig. 1; Fig. 3 a transverse section on the plane of the line 3—3 of Fig. 2; Fig. 4 a view of a modification more particularly with relation to the supply of liquid to the atomizing disks; and Fig. 5 a detail of Fig. 4. Similar reference numerals indicate similar parts in the several views.

Referring to Figs. 1, 2 and 3, the numeral 1 designates a liquid supply pipe supported in any suitable way in a standard 2 of the casing 3 within which the atomizer is placed. The end of the pipe 1 is closed and its lower side provided with openings 4. Supported upon the pipe are collars 5, each having inverted V-shaped sections or portions 6 which serve to deflect the liquid against the sides of the disks 7 and 8. The latter are arranged in pairs as shown, and while I have indicated in the drawings two pairs or sets of these disks, I may use a single pair or more than two pairs. The disk 7 is preferably made concave and the disk 8 with a flat base and an outwardly flaring flange 8'. The diameter of disk 7 is preferably substantially the same as that of the base or bottom of disk 8, so that when the disks are placed in juxtaposition there will be a marginal slot or space between the edge of disk 7 and disk 8 substantially as shown. In practice the disks may be of any desired diameter. I have made them of about eight inches in diameter with the marginal slot between the disks of from 2/8ths to 3/8ths of an inch. The disks are secured together in any suitable manner so as to form a hollow body. One method of securing them is by bolts 9 having spacing collars 10 thereon. In such arrangement the right-hand disk 7 is secured to a shaft 11 and the remaining disks have a bearing on the inlet pipe 1. The shaft 11 is suitably supported in a bearing 12 and is rotated through a drive connection 13.

Also secured to the shaft 11 is a fan 14, and between the fan and the atomizer is placed a conical air deflector 15. This deflector is stationary and is supported on a bearing block 16 through which the shaft 11 passes. The block 16 is supported in a bracket 17 within the casing 3. In addition to the openings 4 I may provide an additional opening 4' between the sets of atomizing disks, as shown in Fig. 1, to deliver a portion of the liquid against the outer sides of the disk 8.

In operation, the water or other liquid to be sprayed or atomized is admitted through pipe 1 and escapes through openings 4 and 4'. As the liquid leaves the pipe it is deflected against the sides of the rapidly rotating disks along the surfaces of which it is spread into a relatively thin sheet, and as these sheets meet in the space between the edge of the disk 7 and the disk 8 they are directed against the flange 8', and by the latter thrown off into the space within the casing 3. The centrifugal force by which the liquid is thrown off from the disk 8 is such as to break up the liquid into very fine particles, in fact, to atomize the liquid so that it appears in the form of a mist.

The construction illustrated has been used by me for moistening air, and in such case I connect the pipe 1 with a source of water supply. The fan 14 creates a current of air in the direction of the arrow and directs it against the conical deflector 15 by which the air is thrown upward and outward against the issuing atomized or water spray. The air current so moistened is distributed through the open end of the casing 3 into the room in which the atomizer is located.

In Fig. 4 I have shown a modification adapted for installations where the supply of water to the individual atomizers may be regulated. In this form the atomizers are supported to rotate about a pipe 18 having a closed outer end. The water is delivered from a tank 19 through valved connections to distributing pipes 20, 21 and 22, all of which are extended into pipe 18, their outer ends being closed. The pipe 18 is formed with openings 18' through which project short pipes 20', 21' and 22' in proximity to the faces of the disks 7 and 8. By adjusting the valves in the connections to the pipes 20, 21 and 22 the volume of water to each atomizing unit may be regulated.

What I claim and desire to secure by Letters Patent of the United States is:—

1. A liquid atomizer comprising two disks placed in juxtaposition so as to provide a marginal opening between them, said disks being of different diameters and the larger having an outwardly projecting flange, a stationary perforated liquid supply pipe extending into the space between the disks so as to deliver the liquid into the space between the disks, and means for rotating said disks.

2. A liquid atomizer comprising a substantially flat disk having an outwardly projecting flange, a concave disk placed in juxtaposition to said flat disk with its edge within the plane of the edge of said flange, so as to provide a marginal opening between the disks, a stationary perforated liquid supply pipe extending into the space between the disks so as to deliver the liquid into the space between the disks, and means for rotating said disks.

3. A liquid atomizer comprising a hollow body consisting of two disks placed in juxtaposition so as to provide a marginal slot or opening between them, a stationary liquid supply pipe extending into the space between the disks, means for rotating said disks, and means supported by said supply pipe for deflecting the water from said pipe directly against each disk.

4. A liquid atomizer comprising a concave disk and a substantially flat disk, said disks being placed in juxtaposition so as to provide a marginal slot or opening between them, a perforated supply pipe about which said disks are supported, deflectors below the openings in said pipe to direct the liquid against the sides of the disks, and means for rotating said disks.

In testimony whereof I have hereunto signed my name in the presence of the subscribing witnesses.

JOHN LYNN.

Witnesses:
M. E. McNINCH,
CHARLES S. JONES.